US012606316B2

(12) United States Patent (10) Patent No.: US 12,606,316 B2

Jouper (45) Date of Patent: Apr. 21, 2026

(54) DISTRIBUTED WIRELESS POWER DISTRIBUTION SYSTEM

(71) Applicant: Astronics Advanced Electronic Systems Corp., Kirkland, WA (US)

(72) Inventor: Jeffrey A. Jouper, Outlook, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 18/381,575

(22) Filed: Oct. 18, 2023

(65) Prior Publication Data

US 2024/0124151 A1 Apr. 18, 2024

Related U.S. Application Data

(60) Provisional application No. 63/417,179, filed on Oct. 18, 2022.

(51) Int. Cl.
| | |
|---|---|
| *B64D 41/00* | (2006.01) |
| *H02J 50/00* | (2016.01) |
| *H02J 50/20* | (2016.01) |
| *H02J 50/40* | (2016.01) |
| *H02J 50/80* | (2016.01) |

(52) U.S. Cl.
CPC ............ *B64D 41/00* (2013.01); *H02J 50/001* (2020.01); *H02J 50/20* (2016.02); *H02J 50/402* (2020.01); *H02J 50/80* (2016.02); *B64D 2221/00* (2013.01)

(58) Field of Classification Search
CPC .... B64D 41/00; B64D 2221/00; H02J 50/001
See application file for complete search history.

(56) References Cited

U.S. PATENT DOCUMENTS

| | | | | |
|---|---|---|---|---|
| 2006/0281435 | A1* | 12/2006 | Shearer | G06K 19/0702 |
| | | | | 455/343.1 |
| 2009/0184877 | A1* | 7/2009 | Bommer | H02J 50/50 |
| | | | | 343/708 |
| 2015/0022373 | A1* | 1/2015 | Bommer | B64D 37/00 |
| | | | | 340/870.11 |
| 2015/0203206 | A1* | 7/2015 | Dueser | H02J 50/10 |
| | | | | 307/9.1 |
| 2016/0134126 | A1* | 5/2016 | Tillotson | H04B 5/263 |
| | | | | 307/104 |
| 2016/0221441 | A1* | 8/2016 | Hall | H02J 50/005 |
| 2017/0250559 | A1* | 8/2017 | Narayanan | H02J 7/34 |
| 2021/0179287 | A1* | 6/2021 | Gut | B64D 11/0646 |
| 2023/0302927 | A1* | 9/2023 | Cook | B60L 53/126 |

OTHER PUBLICATIONS

International Search Report and PCT Written Opinion for Application No. PCT/US2023/035443 mailed Feb. 28, 2024.

* cited by examiner

*Primary Examiner* — Daniel Cavallari
*Assistant Examiner* — Joseph N Inge
(74) *Attorney, Agent, or Firm* — Wiggin and Dana LLP

(57) ABSTRACT

A system and method to provide a power distribution network to wirelessly power sensors, micro powered devices and switches to perform passenger functions as needed. An example implementation in an aircraft is a switch used to control overhead reading lights, where the switch is wirelessly provided with power in order to operate, and where the switch communicates with and is controlled by a control system also by way of wireless communication. An alternative application may, for example, be a sensor placed within storage areas inaccessible to conventional wiring.

20 Claims, 4 Drawing Sheets

200

110

Seat Power Box
110

410          420

450

500

DISTRIBUTED WIRELESS POWER DISTRIBUTION SYSTEM

CROSS-REFERENCE TO RELATED APPLICATION

This application is an International Application claiming priority to U.S. Provisional Patent Application No. 63/417,179, filed Oct. 18, 2022, which is incorporated by reference in its entirety herein.

FIELD OF THE INVENTION

The present invention relates to a system and method to wirelessly deliver power to a plurality of sensors and or micro powered devices to perform sensing and control of systems, for example, within an aircraft environment.

BACKGROUND OF THE INVENTION

Typical power systems on aircraft today provide power to devices by way of a direct connection to an electrical power system provided by the aircraft generator, electrical distribution system, power monitor and control units, and power conversion units. This direct, hard-wired connection provides power to those devices requiring power. The delivered power can be an alternating current form of 115 VAC 360-800 Hz, 110 VAC 60 Hz or a suitable DC voltage 5 or 28 VDC, for example, or any other form required by the equipment to be powered. Due to the relatively large amount of power to be supplied to these devices, which may range from watts to even hundreds of watts, direct electrical connection through wire is generally the most suitable method of connection and power delivery. With the addition of increasing numbers of small micro powered sensors and other devices being utilized in the aircraft environment, the wired connection and supply of power to these devices through conventional means adds physical size and weight to the system and burdens the aircraft. In addition, this limits the placement of these sensors to locations where wire connections can be accomplished without intruding into the passenger space of the aircraft.

As can be appreciated by one skilled in the art, a method of power delivery to these micro powered devices is needed for future installations of linked and powered sensors in an aircraft environment.

SUMMARY OF THE INVENTION

In an embodiment, the present invention is directed to a system and method to provide a power distribution network to wirelessly power sensors, micro powered devices and switches to perform passenger functions as needed. An example implementation is a switch used to control overhead reading lights, where the switch is wirelessly provided with power in order to operate, and where the switch communicates with and is controlled by a control system also by way of wireless communication. An alternative application may, for example, be a sensor placed within storage areas inaccessible to conventional wiring.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE INVENTION

Figure 1:
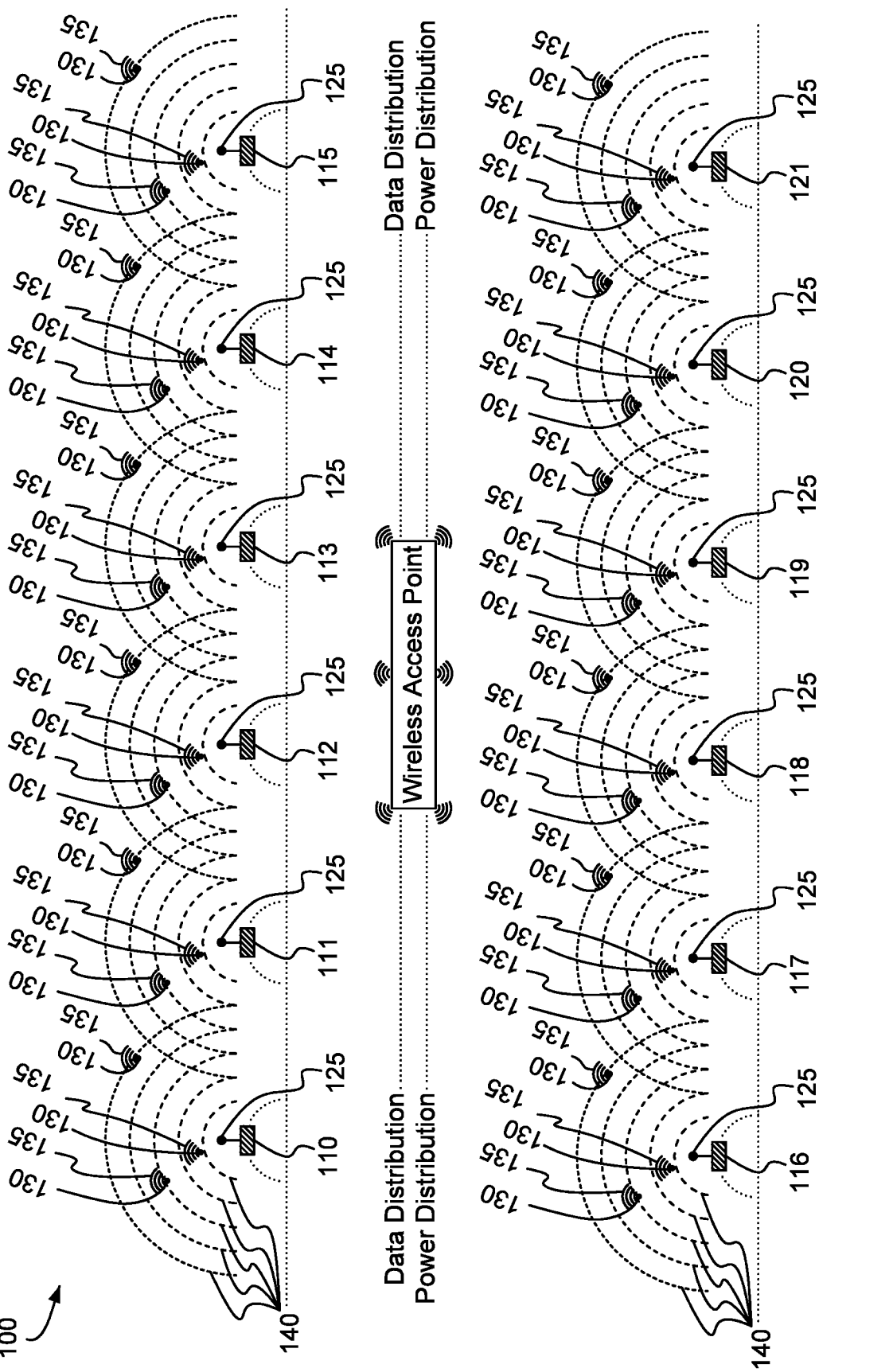
FIG. 1 is a diagram of a system architecture depicting the wired and wireless connections between the power system, wireless sensors and data collection points.

One of ordinary skill in the art would readily recognize that the system of the present invention may be applicable and utilized in many different scenarios; however, one advantageous application is especially suited to a long, narrow vehicle such as an aircraft. While radiant antennas may be used to wirelessly deliver power, radiant antennas tend to rapidly lose transfer of power the farther you are from the antenna source. The energy available is reduced by the square of the distance. Furthermore, additional power is lost through obstruction or absorption by materials between the antenna and the receiver. Therefore, the transfer of energy suffers as you move through the aircraft further from the antenna source in the direction of the intended power use.

According to an embodiment, power is delivered via wired conductors to a number of small RF emitters spaced throughout the service area. At each RF emitter, power may be delivered via further wired connections to certain devices in the immediate area, such as, for example devices in a seat group of an aircraft. In addition, each RF transmitter wirelessly supplies power for other wireless devices in the local area. The RF transmitter has a targeted frequency matching the receiver antenna on the intended sensor or switch assembly which is to wirelessly receive power. This frequency may be in the range of 300 MHz to 5.8 GHz and can transfer enough energy to power a remote wireless device, as well as provide communications from the wireless device being powered, back to a central control system of a host device. Using either the 2.4 GHz or 5.8 GHz frequency ranges allows for harvesting power from other unintended RF sources such as a local WiFi wireless communications system.

In the case of an aircraft application, power to each RF emitter is supplied from the aircraft generator system via wired conductors to an input of a power conversion unit in each seat area or grouping. The power conversion unit converts the aircraft power to a form usable by higher power devices, such as a cellular phone charger or a laptop and provides this power to an outlet unit to provide convenient connection to the passengers' electronic device such as a universal AC outlet or a USB Type A or Type C connection. In addition, a radiant antenna and wireless transmitter are provided with each power converter in the system to target small or low-power wireless devices within a short distance of the power converter. This distance is usually equal to a radial area to encapsulate the seat group in which the RF or radiant antenna is installed, as well as a slightly larger area in order to overlap with adjacent seat groups to provide full coverage in a cellular fashion.

This system provides radiant power to devices that only require micro-power defined as typically less than 0.1 watt to power themselves through energy harvesting, communicate with the host device and perform their intended function, such as switches to activate lights, sensors for passenger occupancy, sensors for stowage utilization and sensors for seat belt status, just by way of example.

There exist many wireless methods of harvesting energy from RF sources, such as RFID, wireless energy from radio signals and the like. One advantage of an embodiment of the present invention is to overcome the need for large transmitters in a local area or space. In general, targeted energy harvesting is typically accomplished by using a distributed number of sensor nodes containing a receiver of RF energy at each node and a source of radiated energy feeding many nodes in a localized area.

In the aircraft environment, it is often difficult to transfer information or power reliably because the fuselage is a tube structure. As signals propagate from the source of power (transmitter) to the receiver, power decreases by the square of the distance from the transmitter. In order to transfer enough energy to a device to harvest sufficient energy and operate the device, the source must produce sufficient energy to overcome the losses due to distance, or the distance from the transmitter to the receiver must be minimized.

In the case of wireless communications, there are normally a plurality of wireless communication access points such as 3-6 depending on the length of the aircraft.

These data distribution systems require high power transmitters to overcome the losses due to distance to an attached device such as a tablet or phone for transfer of wireless data. In order to wirelessly transfer enough energy to a device for harvesting and utilization, the transmitter will have to increase in power exponentially as the distance increases.

In an embodiment, the present invention overcomes the need for large transmitters in the aircraft environment where transmission of high power signals may interfere with aircraft essential systems, such as flight navigation, or may render the data transfer un-usable as distribution of wireless power may interfere with the transfer of wireless data to passenger or aircraft device data.

Transfer of power in a local, cellular fashion mitigates these shortcomings by attaching a small intended RF emitter to seat mounted equipment at different locations in the aircraft. Most aircraft today contain either In-Flight Entertainment (IFE), PC power systems, or both, within the seat structure. These systems include a power distribution network to power these systems from aircraft generated power. By attaching an intended RF power transmitter to these systems, a power "bubble" is created in the vicinity of the seat structure to which it is attached. Localized energy harvesting devices in this vicinity can be powered by the intended RF transmitter as the distance from the local transmitter to the receiving device now becomes much smaller. In a typical aircraft, 50 or more transmitters may be distributed throughout the cabin, e.g., wherever a seat mounted power converter or seat interface box is attached.

Wireless sensors in the seat area that are powered by energy harvesting can then harvest from a local source and transmit within this localized area to send information to a data collection system such as the Cabin Services System (CSS) or IFE system for further handling and processing of tasks. These tasks can be activation of lighting, sensing of seatbelt status, passenger presence or stowage bin volume monitoring.

In addition to providing power through either the PC power or IFE network, the overhead lighting system may also be fitted with RF power transmitting capability for devices in the overhead area to use. Again, this keeps the power level required to power devices such as stowage bin sensors (overhead), oxygen mask and bottle status, light sensors very low.

FIG. 1 shows a block diagram of an exemplary localized wireless power distribution system 100 according to an embodiment of the present invention. Each seat power box 110-121 (depicted as a rectangle) is used to provide AC power for personal electronic devices (PED) or DC power for other devices, or both. In addition, the seat power box, in conjunction with a radiant antenna 125, transmits an RF signal used by other devices 130 in the immediate area for energy transfer/harvesting. The semicircular arcs 140 symbolically represent the local area in which power may be wirelessly broadcast to receiving devices. The arcs become fainter, again, to symbolically represent the delivery of less power as the distance from the radiant antenna increases.

In the example of FIG. 1, AC power is connected to seat power box 110, through seat power box 101 to seat power box 102 and on in a daisy chain fashion. Each of the seat power boxes 110-121 contains an RF energy generator connected to an RF transmitting antenna, in order to transmit this power to wireless or remote sensors/switches 130 in the local area of a seat group.

Sensors and other devices 130 located in the area of each seat structure contain a receiving antenna 135 used to capture RF energy where it is then converted to direct current to be used and stored by the sensor or device 130 to perform the functions for which it is designed, and to communicate back, as necessary, to the seat power box 110-121 or other access point device.

These wireless sensors or devices 130 may include switches, passenger presence sensors, seat belt sensors and many other sensor types. Each sensor 130 captures and converts the received energy for use in processing the sensor or device input and presenting that data through a wireless connection to an access point on the aircraft.

Each sensor/switch 130 is wirelessly powered by the RF transmitter and operates to process and transmit the status of the sensor/switch to a data collection system, such as that outlined in U.S. Pat. No. 9,978,011, which is incorporated by reference herein in its entirety. Other systems matching the transmitted output could also be used, such as, for example, an on-board Wireless Data system used for in-flight entertainment.

Figure 2A:
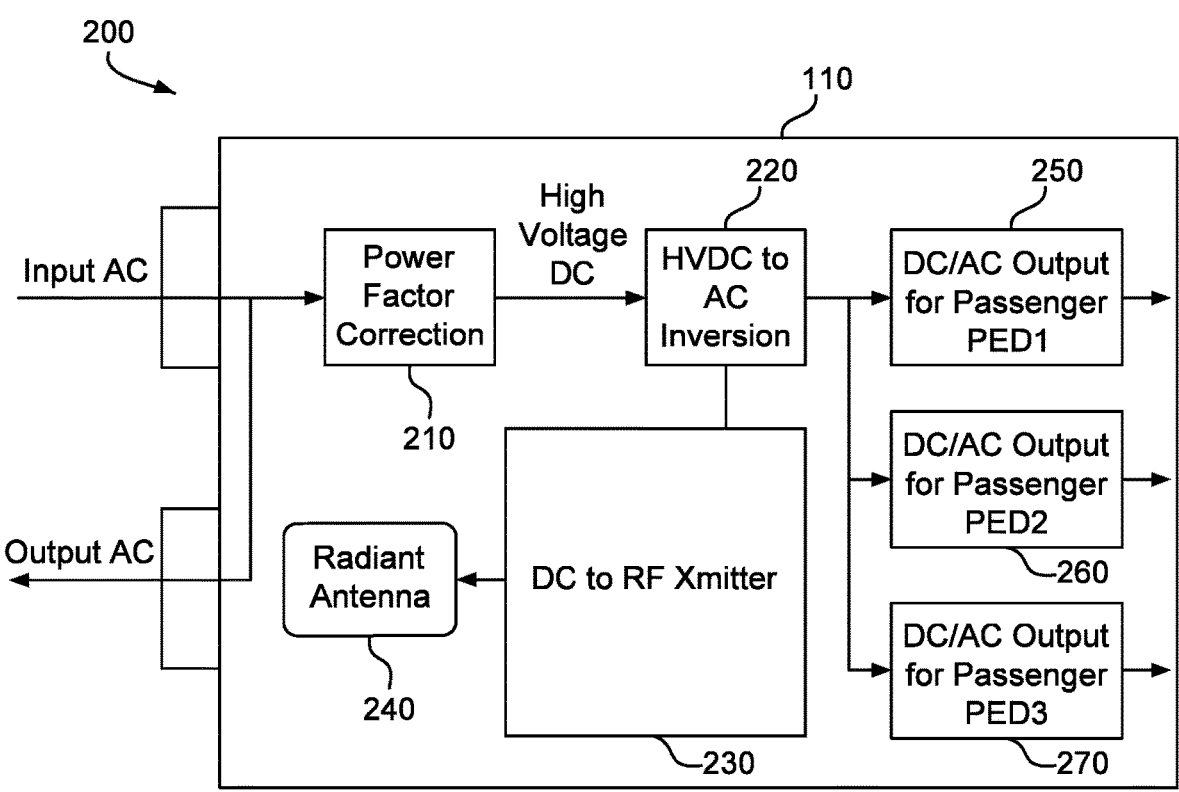
FIG. 2a is a block diagram of a power supply unit for converting aircraft AC power to forms usable by a passenger for powering electronic devices while also supplying a Radio Frequency (RF) power source to power sensors and devices requiring micro power levels to operate.

FIG. 2*a* is a block diagram of a power supply unit 200 for converting aircraft AC power to forms usable by a passenger for powering electronic devices while also supplying a Radio Frequency (RF) power source to power sensors and devices requiring micro power levels to operate.

AC power is connected to the input of the seat power box, e.g., 110, where it is converted to a high voltage DC through a power factor correction converter 210. The high voltage DC is further converted by way of High Voltage DC to AC Inversion 220 to either an AC or DC output 9250, 260, 270) for use by the PEDs attached. In addition, a DC to RF converter 230, processes the DC power available to provide to an RF transmitter at a targeted frequency for transmitting that power to remote wireless devices such as sensors or switches. The transmit frequency is typically in the range of 300 MHZ to 5.8 GHz. The particular frequency to be used may be chosen so as to be in a frequency band which will not interfere with other systems that are in the vicinity of the radiating antenna so that the wireless power distribution system will not cause degradation of communications in the local area.

Figure 2B:
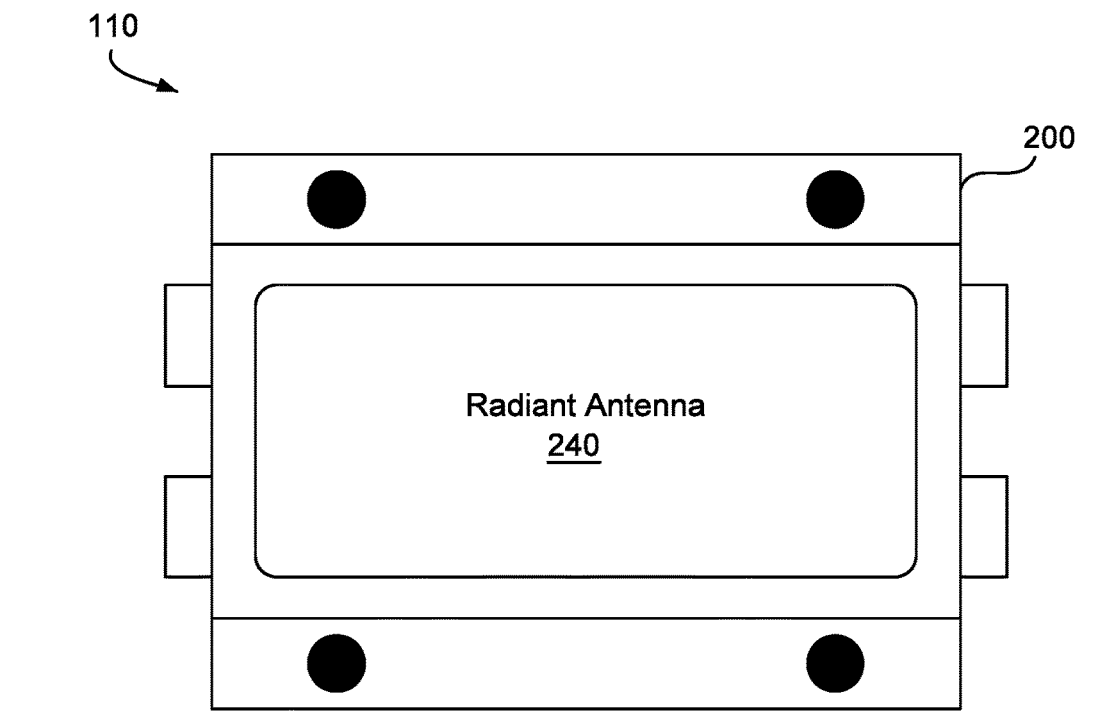
FIG. 2b is a diagram of a radiant antenna integrated into a seat power box.

FIG. 2*b* is a diagram showing an exemplary physical construction of the seat power box, e.g., 110, showing the power supply unit 200 as well as the radiant antenna 240 on the top of the power supply where the radiant antenna is integrated into the seat power box.

Figure 3A:
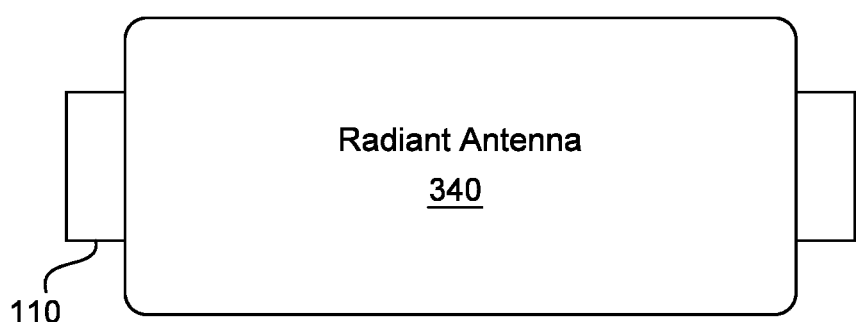
FIG. 3a is a diagram of a radiant antenna which may be added to an existing seat power box.

FIG. 3*a* is a diagram of a radiant antenna 340 which may be added to an existing seat power box, e.g., 110.

Figure 3B:
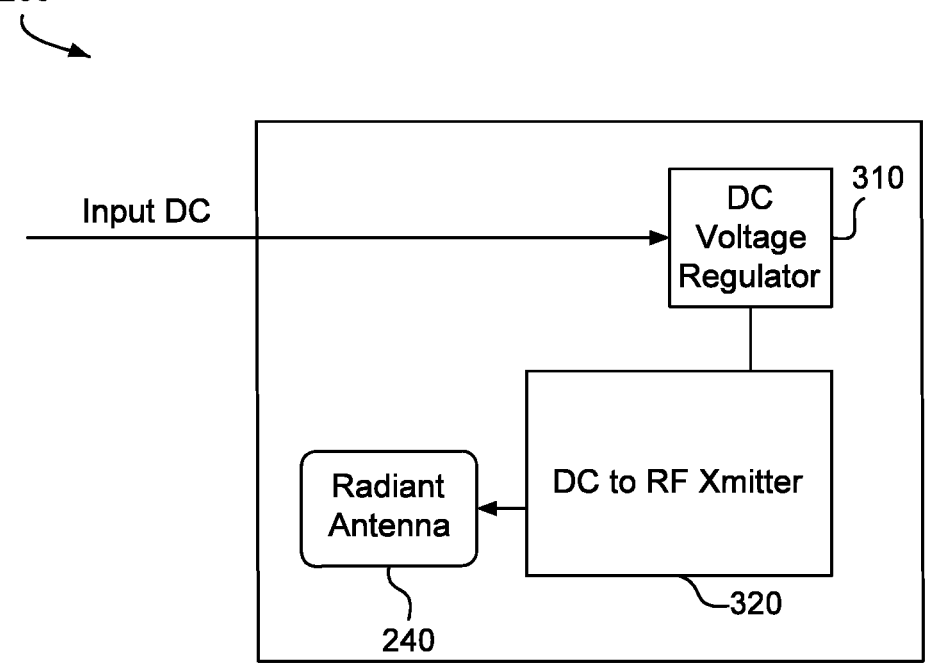
FIG. 3b is a block diagram of a power supply unit for converting aircraft DC power to supply a Radio Frequency (RF) power source to power sensors and devices requiring micro power levels to operate.

FIG. 3*b* is a block diagram of a power supply unit 200 for converting aircraft DC power to supply a Radio Frequency (RF) power source to power sensors and devices requiring micro power levels to operate. The DC voltage is available at the output of the power supply, such as 5-28 VDC commonly found on any system attached to an airline seat. The DC input is first applied to a DC Voltage Regulator 310, which then provides its output to DC to RF Xmitter 320 which converts the DC signal to an equivalent RF signal. The RF signal is in turn provided to the Radiant Antenna 240 for outputting by the Radiant Antenna 240 as electromagnetic waves for supplying electrical power to sensors or switches 130.

Figure 4A:
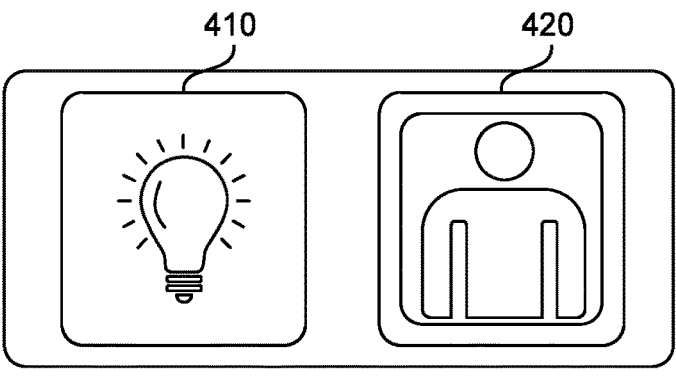
FIG. 4a is a diagram illustrating a light control switch and an attendant call button which may be wirelessly powered.

FIG. 4*a* is a diagram illustrating a light control switch 410 and an attendant call button 420 which may be wirelessly powered.

Figure 4B:
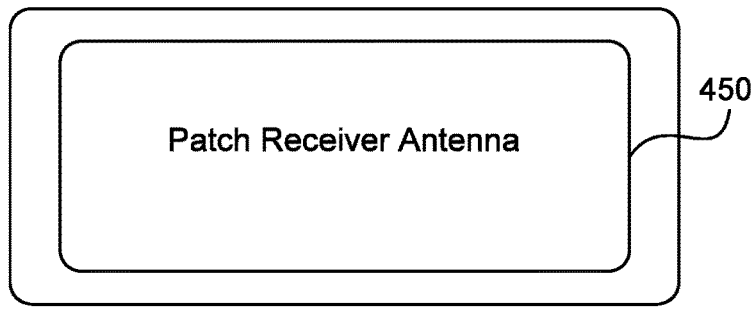
FIG. 4b is a diagram of a patch receiver antenna used to wirelessly receive power.

FIG. 4*b* is a diagram of a patch receiver antenna 450 used to wirelessly receive power. Such a patch receiver antenna 450 may be affixed on or near a sensor/switch 130 for receiving power to provide to the sensor/switch 130.

Figure 4C:
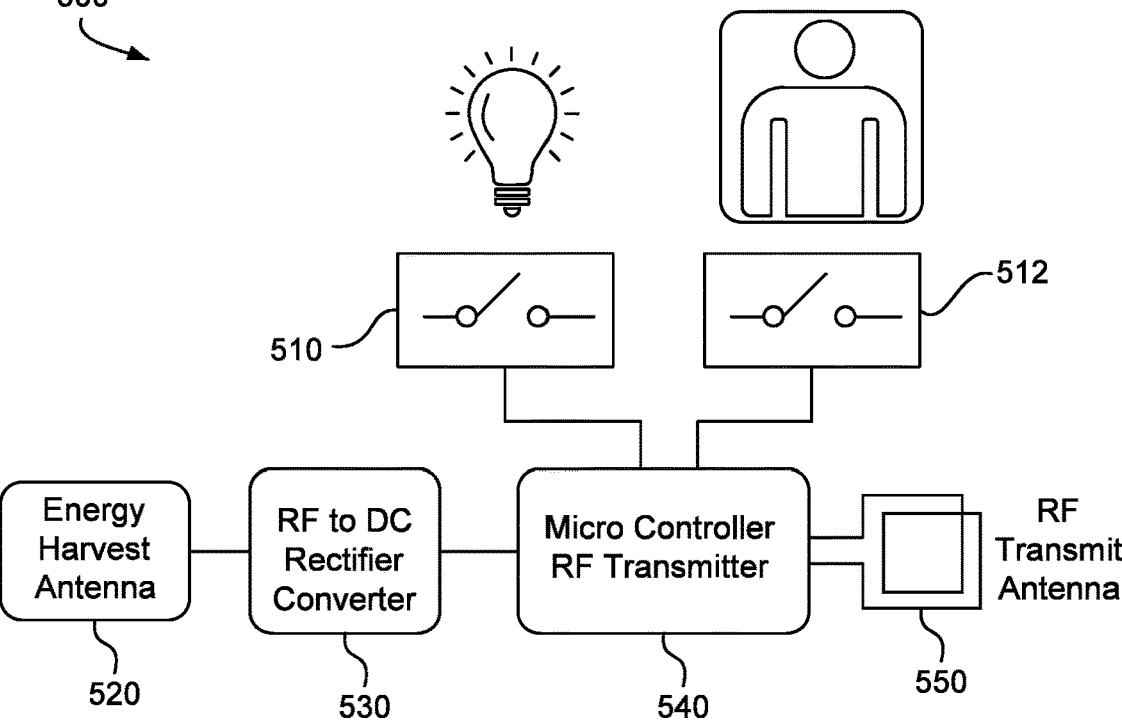
FIG. 4c is a block diagram of a circuit for wirelessly receiving power, interfacing with a reading light control switch, an attendant call light/switch, and transmitting data to a control system.

FIG. 4*c* is a block diagram of a circuit 500 for including a power switch assembly 510, 512 used to receive RF energy for harvest, converting the RF to usable DC voltage/current, receive inputs from two switches used as attendant call and reading light control and transmit the appropriate data to a receiving system to control the overhead reading lights and attendant call function. More specifically, an Energy Harvest Antenna 520 operates to receive electromagnetic waves (containing power) and provides the incoming signal to an RF to DC Rectifier Converter 530 which operates to bring down the frequency of the incoming signal from an RF frequency signal to a DC level signal. This DC signal is used to power a MicroController and an RF Transmitter 540. The MicroController portion communicates with and provides power to sensor/switch 130 by way of selectively controlled switches 510 and 512. The MicroController portion also operates to receive signals (e.g., status of sensor/switch 130) and provides these signals to RF Transmit Antenna which in turn transmits these sensor/switch signals via electromagnetic waves to seat power box, e.g., 110-121.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A wireless power distribution system located within a vehicle, comprising;

a plurality of power radiating antennas located within the vehicle, each antenna connected to and having an associated power box capable of providing power to each associated antenna, the power boxes being connected in a daisy-chain arrangement within the vehicle, at least one antenna receiving power by way of a conductor connected to a power box associated with an adjacent antenna and each antenna radiating an electromagnetic signal providing power in a local area adjacent to each antenna;

a plurality of energy harvesting devices operable to receive a portion of the radiated electromagnetic signals and provide power based on the received radiated electromagnetic signals to a plurality of remote electronic devices; and a plurality of signal receiving antennas, each operable to receive a communication or status signal associated with one of said remote devices.

2. The wireless power distribution system of claim 1, wherein each power radiating antenna and each respective corresponding signal receiving antenna are formed as one antenna structure.

3. The wireless power distribution system of claim 1, wherein at least one of the signal receiving antennas comprises a patch receiver antenna.

4. The wireless power distribution system of claim 1, wherein at least one of the energy harvesting devices further comprises an energy harvesting antenna.

5. The wireless power distribution system of claim 4, wherein at least one of the remote electronic devices comprises a sensor or a switch.

6. The wireless power distribution system of claim 5, wherein at least one of the energy harvesting devices further comprises an RF to DC converter operable to convert electromagnetic signals received by the energy harvesting antenna into a DC signal for providing power to said sensor or switch.

7. The wireless power distribution system of claim 6, further comprising a controller operable to communicate with said sensor or switch.

8. The wireless power distribution system of claim 7, wherein said controller includes a microcontroller and is operable to receive a status signal from said sensor or switch, and provide said status signal to a transmit antenna operable to transmit said status signal in the form of an electromagnetic signal.

9. The wireless power distribution system of claim 7, wherein said controller includes a microcontroller and is operable to provide a control signal to said sensor or switch.

10. A wireless power distribution system for an aircraft, comprising:

a plurality of power radiating antennas distributed along a long dimension of a fuselage of the aircraft, each antenna connected to and having an associated power box capable of providing power to each associated antenna, the power boxes being connected in a daisy-chain arrangement within the aircraft, at least one antenna receiving power by way of a conductor connected to a power box associated with an adjacent antenna and each antenna radiating an electromagnetic signal providing power in a local area adjacent to each antenna;

a plurality of energy harvesting devices operable to receive a portion of the radiated electromagnetic signals and provide power based on the received radiated electromagnetic signals to a plurality of sensors or switches located remotely within the fuselage;

a plurality of signal transmit antennas operable to transmit electromagnetic signals corresponding to a status of one of said sensors or switches; and a plurality of signal receiving antennas, each operable to receive the electromagnetic signal associated with one of said sensors.

11. The wireless power distribution system of claim 10, wherein at least one of said power radiating antennas is located in a vicinity of a seat power box of the aircraft.

12. The wireless power distribution system of claim 10, wherein each power radiating antenna and each respective corresponding signal receiving antenna are formed as one antenna structure.

13. The wireless power distribution system of claim 10, wherein at least one of the signal receiving antennas comprises a patch receiver antenna.

14. The wireless power distribution system of claim 10, wherein at least one of the energy harvesting devices further comprises an energy harvesting antenna.

15. The wireless power distribution system of claim 14, wherein at least one of the energy harvesting devices further comprises an RF to DC converter operable to convert electromagnetic signals received by the energy harvesting antenna into a DC signal for providing power to said sensor or switch.

16. The wireless power distribution system of claim 15, further comprising a controller operable to communicate with said sensor or switch.

17. The wireless power distribution system of claim 16, wherein said controller includes a microcontroller and is operable to receive a status signal from said sensor or switch, and provide said status signal to a transmit antenna operable to transmit said status signal in the form of an electromagnetic signal.

18. The wireless power distribution system of claim 17, wherein said microcontroller is operable to control said sensor or switch.

19. The wireless power distribution system of claim 10, wherein the power radiating antennas are positioned with an overhead lighting system to provide power for devices in an overhead area of the aircraft fuselage, wherein such overhead devices include stowage bin sensor, oxygen mask and bottle status, or light sensors.

20. A wireless power distribution system located within a vehicle, comprising:

a plurality of power radiating antennas located within the vehicle, each antenna connected to and having an associated power box capable of providing power to each associated antenna, the power boxes being connected in a daisy-chain arrangement within the vehicle and distributed throughout a coverage area, at least one antenna receiving power by way of a conductor connected to a power box associated with an adjacent antenna and each antenna radiating an electromagnetic signal providing power in a local area adjacent to each antenna;

a plurality of energy harvesting antennas operable to receive a portion of the radiated electromagnetic signals and provide power based on the received radiated electromagnetic signals to a plurality of sensors or switches located remotely within the coverage area;

at least one controller operable to receive a status signal from said sensor or switch, or provide a control signal to said sensor or switch, and further operable to provide said status signal to a transmit antenna operable to transmit said status signal in the form of an electromagnetic signal; and a plurality of signal receiving antennas, each operable to receive the electromagnetic signal associated with one of said sensors.

* * * * *